United States Patent [19]

McVeen

[11] 4,312,426

[45] Jan. 26, 1982

[54] CHAIN ANCHORING ARRANGEMENT

[75] Inventor: Milford D. McVeen, Highland Heights, Ohio

[73] Assignee: Towmotor Corporation, Mentor, Ohio

[21] Appl. No.: 776,458

[22] Filed: Mar. 10, 1977

[51] Int. Cl.$^3$ .......................... B66B 9/20; F16G 11/12

[52] U.S. Cl. .................................... 187/9 E; 411/120; 403/46; 187/1 A

[58] Field of Search ...................... 187/1 A, 9 R, 9 E; 151/54; 403/46, 305, 361

[56] References Cited

U.S. PATENT DOCUMENTS

| | | | |
|---|---|---|---|
| 2,370,944 | 3/1945 | Emerson | 151/54 |
| 2,390,838 | 12/1945 | Johnson | 151/54 |
| 3,061,047 | 10/1962 | Gunning | 187/9 E |
| 4,009,765 | 3/1977 | Leskovec et al. | 187/9 E |
| 4,010,825 | 3/1977 | Chelin | 187/9 R |

FOREIGN PATENT DOCUMENTS

| | | | |
|---|---|---|---|
| 6907 | of 1903 | United Kingdom | 403/46 |

*Primary Examiner*—Jeffrey V. Nase
*Attorney, Agent, or Firm*—Phillips, Moore, Weissenberger, Lempio & Majestic

[57] ABSTRACT

The invention relates to an anchoring arrangement which includes a lock clip fitting about the anchor arrangement and being in longitudinally slidable relative thereto. The lock clip includes a lock tab extending from a portion of the periphery thereof in a direction generally parallel to the anchoring arrangement. A tab retainer is defined by a relatively stationary support member for preventing the lock tab from rotating.

23 Claims, 4 Drawing Figures

Fig. 1
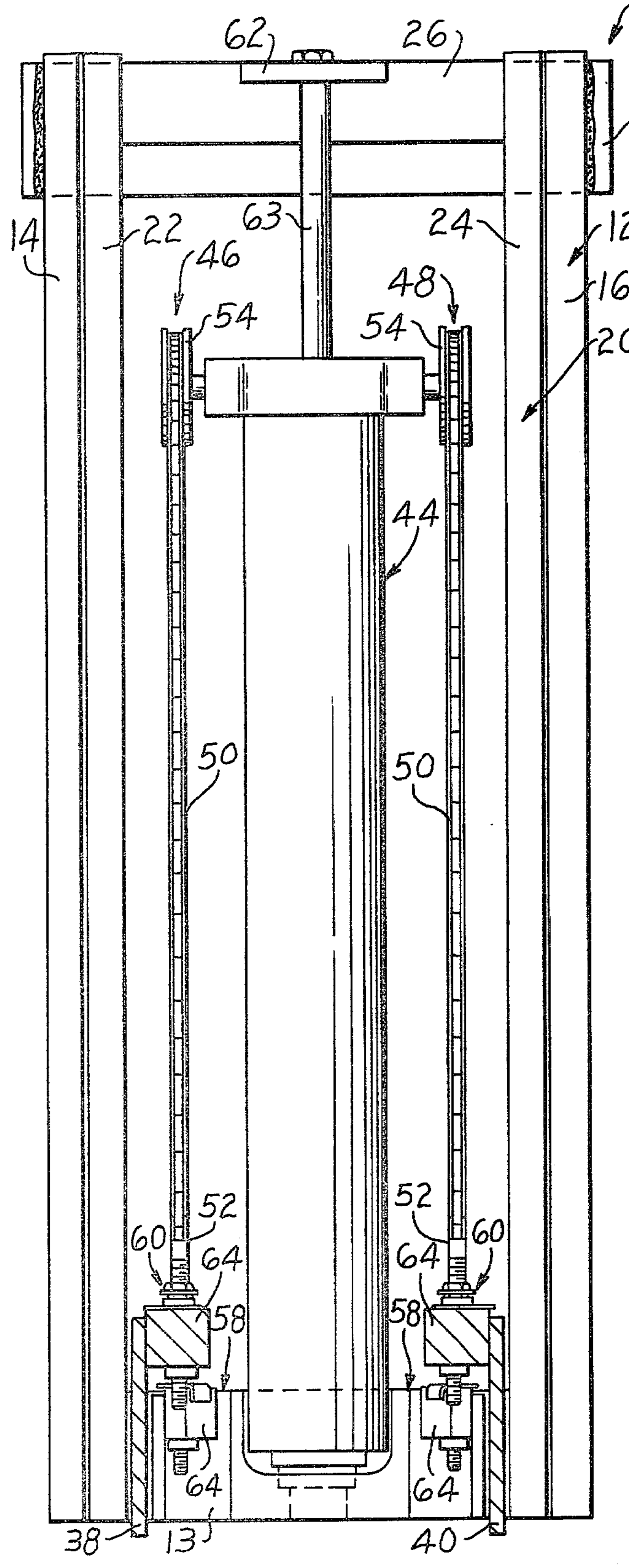
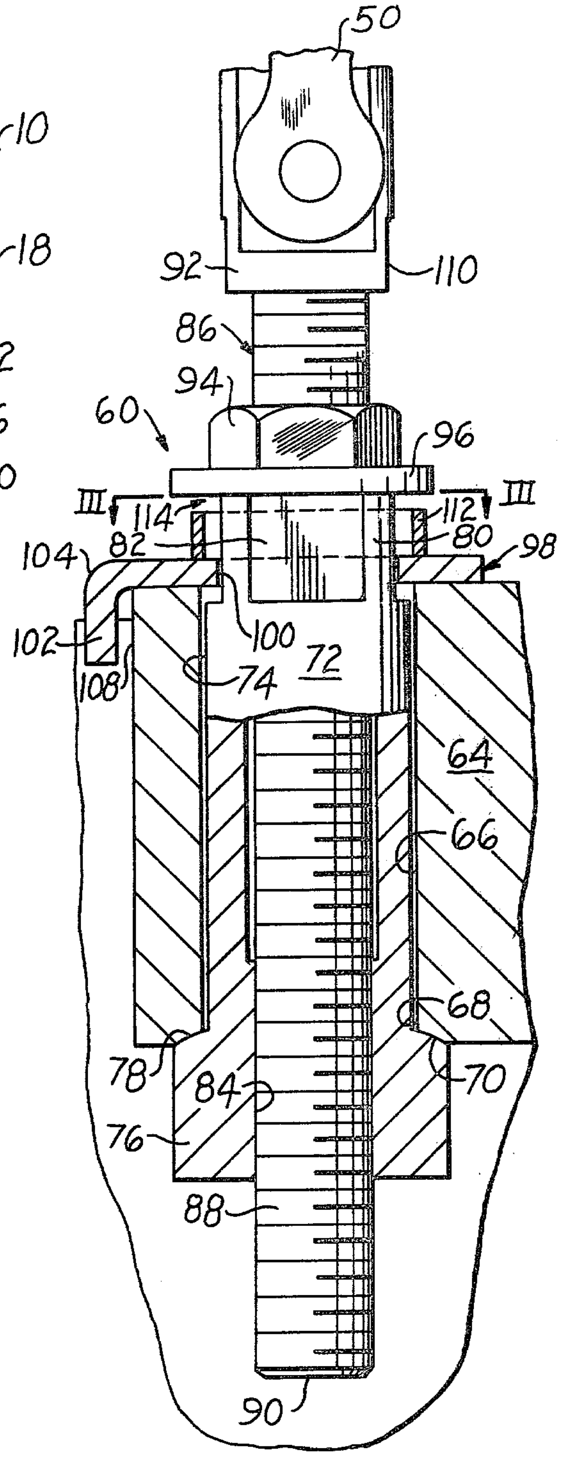
Fig. 4

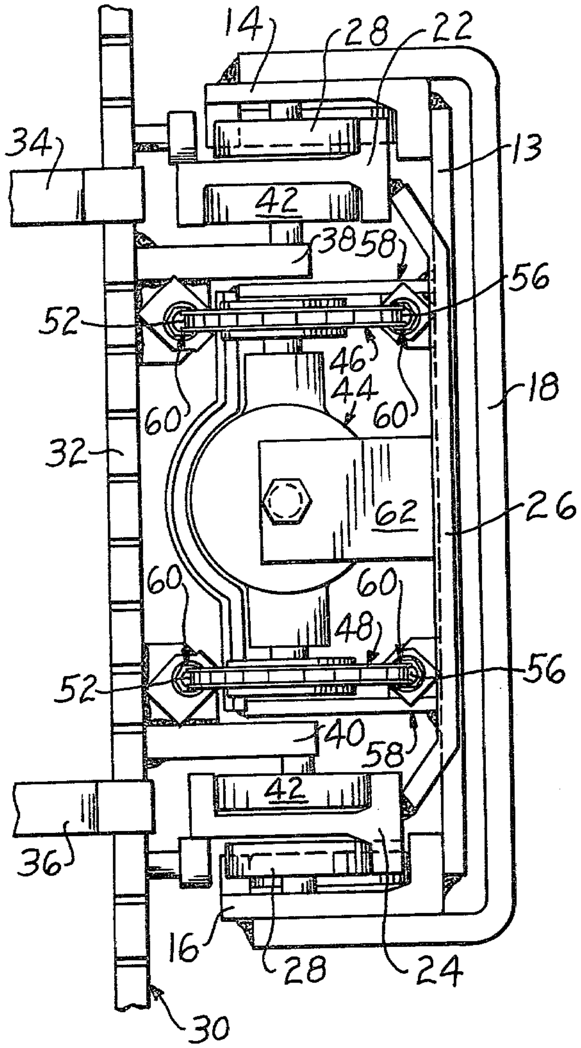
FIG. 2
FIG. 3
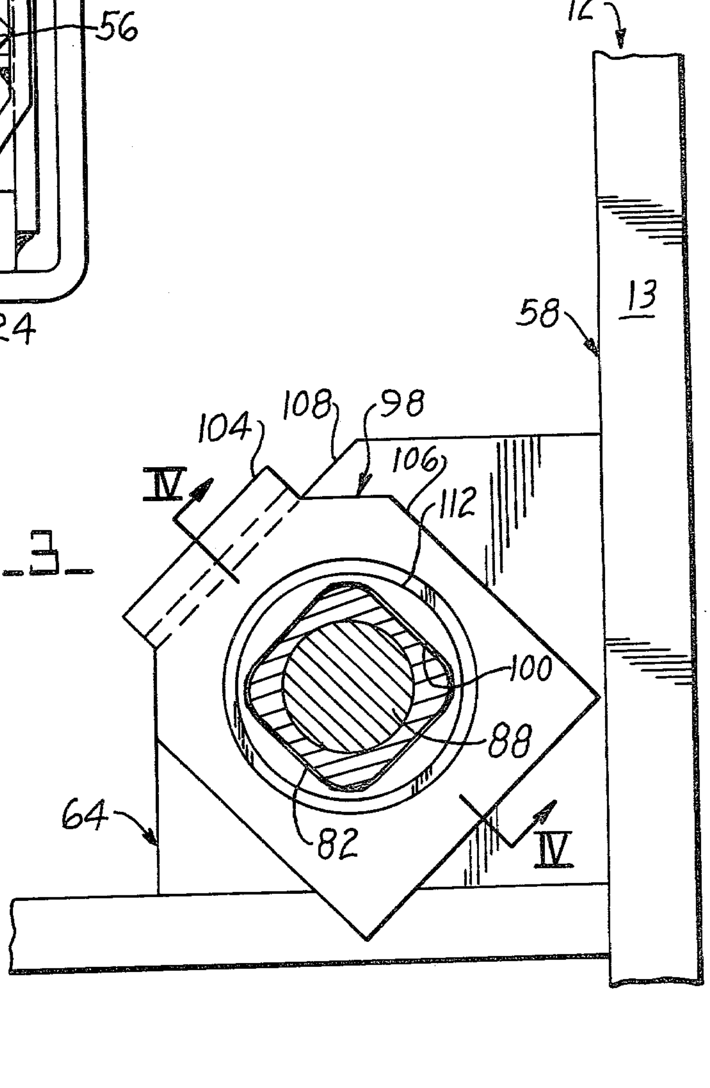

CHAIN ANCHORING ARRANGEMENT

BACKGROUND OF THE INVENTION

1. Field of the Invention

The present invention relates to an adjustable anchor. The invention also relates to such an anchor for use in lift truck mast units.

2. Prior Art

Lift truck mast units commonly employ lift chains in pairs, the lift chains being trained over sheaves mounted upon a movable portion of a lift cylinder for raising a carriage relative to one upright portion of the mast. Adjustment of the anchor is necessary to ensure that the chains are under similar tension so that loads arranged upon the carriage are distributed equally by the parallel lift chains.

One particularly useful adjustable anchor for a lift truck mast unit comprise a housing including means attached to a base structure and means defining a bore arranged parallel to the adjacent end of a lift chain. The bore can preferably have a spherical taper formed about one end thereof opposite the adjacent end of the lift chain. Such an arrangement includes an adjusting sleeve arranged within the bore and having an outer diameter arranged in spaced-apart relation from the bore with a preferably spherically shaped, annular shoulder arranged for bearing engagement with the spherical taper on the housing, the sleeve extending through the bore toward the adjacent end of the lift chain, a peripheral portion of the sleeve being configured to facilitate its rotation within the bore, the sleeve further defining a threaded internal bore. In this arrangement a connector is secured to the adjacent end of the lift chain. The connector has a shank arranged in threaded engagement with the internal threaded bore within the sleeve. A lock nut is arranged upon the threaded shank for engagement with an end of the sleeve to selectively limit relative rotation between the sleeve and the connector.

It is clear that such an arrangement has many advantages. However, in practice and most particularly in the relatively rough usage to which lift trucks and similar equipment are exposed, it has been found that the lock nut will not adequately prevent relative rotation of the connector and the sleeve. In particular, it has been discovered that the sleeve will have a large tendency to rotate away from the lock nut.

SUMMARY OF THE INVENTION

The present invention is directed to overcoming one or more of the problems as set forth above.

According to the present invention an anchoring arrangement is provided for adjustably anchoring an end of a tension member adjacent a relatively stationary support. The arrangement comprises a relatively stationary support member having a bore therethrough. An adjustable sleeve is provided within the bore. The support has a seat surface for bearing engagement with a first end of the sleeve. A second end of the sleeve extends outwardly from the bore and has a non-circular surface formed thereon. The sleeve defines a longitudinally extending threaded internal bore. A connector is provided having a threaded shank. A first end of the connector is in threaded engagement with the internal bore of the sleeve and a second end of the connector is attached to a tension member. A lock clip fits about the second end of the sleeve. The lock clip has a generally central opening shaped to matingly fit over said non-circular surface and to be longitudinally slidable relative to the sleeve. The lock clip includes a lock tab extending from a portion of the periphery thereof. Tab retention means are defined by the support member for preventing the lock tab from rotating and thereby preventing the sleeve from rotating.

BRIEF DESCRIPTION OF THE DRAWINGS

The invention will be better understood by reference to the figures of the drawings wherein like numbers denote like parts throughout and wherein:

FIG. 1 illustrates a lift truck mast assembly which includes a plurality of anchoring arrangements in accordance with the present invention;

FIG. 2 illustrates a top view of the apparatus illustrated in FIG. 1;

FIG. 3 illustrates in top view a locking arrangement in accordance with the present invention; and FIG. 4 illustrates a view taken along the line IV—IV of FIG. 3 and to which a chain has been added.

DETAILED DESCRIPTION OF THE PREFERRED EMBODIMENT

Adverting to FIG. 1 there is illustrated a mast assembly 10 of a lift truck or the like, which mast assembly includes a fixed upright portion 12 supported by a fixed lower cross member 13 comprising a pair of vertical beams 14 and 16 secured in spaced apart relation by upper cross members such as that indicated at 18.

A movable mast unit or assembly 20 includes a pair of upright structural beams 22 and 24 similarly secured together in spaced apart relation by cross pieces such as that indicated in FIGS. 1 and 2 at 26. The beams 22 and 24 of the movable mast assembly 20 are nested between the upright beams 14 and 16. Rollers such as those indicated at 28 are arranged between the adjacent pairs of beams 14, 22 and 16, 24 to facilitate movement of the intermediate mast assembly 20 relative to the fixed upright or mast unit 12.

A carriage unit 30 as shown in FIG. 2 includes cross pieces such as that indicated at 32 and one or more forwardly projecting forks such as those indicated at 34 and 36. These elements of the carriage unit are supported by members 38 and 40 which are nested between the upright beams 22 and 24. The members 38 and 40 are supported for movement relative to the movable mast unit 20 by means of rollers such as those indicated at 42. Movement of the carriage unit 30 and the movable mast unit 20 relative to each other and to the fixed upright unit 12 is initiated and regulated by a conventional motor or hydraulic jack, as indicated at 44, together with similar, parallel lift chain units 46 and 48.

Each of the lift chain units 46 and 48 includes a carriage lift chain 50 adjustably secured at one end 52 to the carriage unit 30 and trained over a sheave 54 mounted upon the rod portion of the hydraulic motor 44. The other end 56 of the chain 50 is adjustably secured to a bottom portion 58 of the fixed upright portion 12 and more particularly to the lower cross member 13. The securing of each of the ends 52 and 56 is by means of the adjustable anchor 60 of the present invention. It will be noted that the one end 52 of each of the chains 50 is thus adjustably secured to the carriage unit 30 via the adjustable anchor 60 of the present invention and the other end 56 is thus adjustably secured to the fixed lower cross member 13. It should also be noted that while the adjustable anchor 60 of the present invention is shown for use in a standard mast unit, such anchors also find use in triple-lift mast units which can include an additional pair of uprights internally of the upright vertical beams 22 and 24.

In operation the hydraulic motor 44 acts between the fixed lower cross member 13 and the cross piece 26 of the movable mast unit 20 and more particularly against a projection 62 which extends therefrom to the center of the mast assembly 10. As the hydraulic motor 44 extends it moves upward as guided by a tie rod 63 and upon contact with the projection 62 lifts the cross piece 26 and hence the upright vertical beams 22 and 24 which are tied together thereby. The chains 50 which are attached at one end 52 to the carriage 30 and at the other end 56 to the fixed upright portion 12 of the mast assembly 10 tie together the movement of the carriage unit 30 with the movement of the movable mast unit 20 whereby a two to one multiplication in distance traveled results between the extension of the rod of the hydraulic motor 44 and the forks 34 and 36 of the carriage unit 30.

Each of the chain units 46 and 48 must be under similar tension for all elevations of the carriage in order to properly distribute the weight of the carriage and its load throughout the various portions of the mast unit. This may be accomplished by the adjustable anchor 60 of the present invention. Generally, each anchor 60 permits tension adjustment in each of the associated chain portions 50 to assure that they are under equal tension when the carriage is at ground level. Accordingly, during subsequent elevation of the carriage, the lift chain units 46 and 48 serve to uniformly support the weight of the carriage and its load.

The adjustable anchor 60 is best illustrated in FIGS. 3 and 4. It should be noted that the present invention contemplates both an adjustable anchor for a pair of opposed chain ends as may be seen within the lift unit described above or an adjustable anchoring for a single lift chain end such as the chain end 56. It will of course be obvious that, in providing an adjustable anchor arrangement for a single chain end, the anchor could alternately be arranged upon the carriage unit 30 or the fixed upright portion 12 of the mast assembly where the chain ends 52 and 56 are illustrated as having anchors. The adjustable anchor 60 as described herein can also be arranged to anchor the lift chain 50 to both the carriage unit 30 and the fixed upright portion 12 of the mast assembly 10.

Referring now primarily to FIG. 4, each adjustable anchor 60 includes a relatively stationary support member 64 having a bore 66 therethrough. A first end 68 of the bore 66 is formed into a seat surface, in the embodiment illustrated a generally spherical taper 70. An adjustable sleeve 72 is within the bore 66 and it has an outer surface 74 spaced from the bore 66. A first end 76 of the adjustable sleeve 72 has a seat mating surface, in the embodiment illustrated an annular shoulder 78 arranged for bearing engagement with the generally spherical taper 70 of the stationary support member 64. A second end 80 of the adjustable sleeve 72 extends outwardly from the bore 66 and has a plurality of flat lateral surfaces 82 formed thereon. The sleeve 72 defines a longitudinally extending threaded internal bore 84 the use of which will soon be apparent.

A connector 86 forms a part of the adjustable anchor 60. The connector 86 has a threaded shank 88. A first end 90 of the connector 86 and more particularly a portion of the threaded shank 88 adjacent the first end 90 of the connector 86 is in threaded engagement with the threaded internal bore 84 of the adjustable sleeve 72. A second end 92 of the connector 86 is attached to a tension member such as one of the carriage lift chains 50. It is clear that by appropriate relative rotation of the adjustable sleeve 72 relative to the connector 86, tension in the respective lift chain 50 can be adjusted.

A lock nut 94 is desirably placed upon the threaded shank 88 adjacent the second end 92 of the connector 86. The lock nut 94, which is preferably used along with a washer 96 serves to selectively limit rotation of the connector 86 relative to the sleeve 72. It has been found that the use of a lock nut 94 alone or in combination with a washer 96 is not sufficient to adequately prevent relative rotation between the connector 86 and the adjustable sleeve 72. The present invention makes use instead of certain arrangements as will be described in following to accomplish the desired selective limitation of rotation while still allowing adjustment in tension of the lift chains 50 or the like.

A lock clip 98 forms an essential part of the present invention and fits about the second end 80 of the adjustable sleeve 72. The lock clip 98, as will be clearest by reference to FIG. 3, has a generally central opening 100 which is shaped to matingly fit over at least two of the flat lateral surfaces 82 of the adjustable sleeve 72 and to be longitudinally slidable relative to the sleeve 72. The lock clip 98 includes a lock tab 102 which extends from a portion 104 of the periphery 106 thereof. The lock tab 102 extends generally parallel to the bore 66 of the stationary support member 64. Tab retention means, in the embodiment illustrated a surface 108 defined by the support member 64, serves to prevent the lock clip 98 from rotating which thereby prevents the adjustable sleeve 72 from rotating. With the provision of a lock clip 98 having a lock tab 102 or the like associated therewith the problem of relative rotation between the adjustable sleeve 72 and the connector 86 is virtually fully eliminated.

As will be noted in FIG. 4 the connector 86 can have adjacent the second end 92 thereof a plurality of flat lateral faces 110. These flat lateral faces serve the purpose of accepting a wrench whereby the lock nut 94 can be turned while the connector 86 is held stationary.

It has been found that while the provision of a lock clip 98 greatly improves an anchor thus leads to provision of a very useful adjustable anchor 60 in accordance with the present invention, that the adjustable anchor 60 can be even further improved by the provision of a spacer 112 which fits about the second end 80 of the adjustable sleeve 72 adjacent the flat lateral surface 82 thereon. The spacer 112 is generally positioned upon and in abutting relation to the lock clip 98. A distance defined by the combined thicknesses of the spacer 112 and the lock clip 98 is restricted to be less than the longitudinal extension of the flat lateral surface 82. Thereby, a gap 114 is provided between the top of the spacer 112 and the bottom of the lock nut 94. More particularly, in the embodiment illustrated wherein a washer 96 sits below the lock nut 94, there will be a gap 114 between the spacer 112 and the washer 96.

As will be noted most clearly by reference to FIGS. 2 and 3 the relatively stationary support member 64 is preferably contiguous with an upright unit such as the fixed upright portion 12 or the movable upright unit 20 of a lift truck.

Operation

In operation, the lock nut 94 is backed off and the washer 96 is likewise backed off along with the spacer 112. A wrench is then placed against the flat lateral surfaces 82 of the adjustable sleeve 72 and the adjustable sleeve 72 is located by rotation thereof relative to the connector 86 whereby tension in the chain 50 is adjusted. It should be noted that the threaded shank 88 of the connector 86 must project sufficiently above the adjustable sleeve 72 so that the nut 94, the washer 96, the spacer 112 and the lock clip 98 can be moved sufficiently upwardly to clear the flat lateral surfaces 82 of the sleeve 72. After proper adjustment has been obtained for the tension in the chain 50, the lock clip 92 is dropped downwardly into the position illustrated in FIG. 3 wherein it is held against rotation by the surface 108 of the stationary support member 64. The spacer 112 is lowered to sit upon the top of the lock clip 98, the washer 96 is allowed to sit atop the second end 80 of the adjustable sleeve 82 and the lock nut 94 is tightened while the connector 86 is held by a wrench which engages with the flat lateral faces 110 thereon.

It is clear that replacement of parts is relatively easy and further that the engagement between the lock tab 102 and the surface 108 along with the mating fit of the flat lateral surfaces 82 with the central opening 100 is such that rotation of the sleeve 72 relative to the stationary support member 64 is completely prevented. Meanwhile, the lock nut 94 prevents rotation of the connector 86 relative to the adjustable sleeve 72.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In an anchoring arrangement for adjustably anchoring an end of a tension member adjacent a relatively stationary support, which comprises a relatively stationary support member having a bore therethrough; a seat portion of said support member formed adjacent an end of said bore; an adjustable sleeve within said bore, a first end of said sleeve having a seat engaging portion for bearing engagement with said seat portion of said support member, a second end of said sleeve extending outwardly from said bore, said sleeve defining a longitudinally extending threaded internal bore; and a connector having a threaded shank, a first end of said connector being in threaded engagement with said internal bore of said sleeve and a second end of said connector being attached to a tension member; an improvement comprising:
   - a non-circular surface formed on said second end of said sleeve;
   - a lock clip fitting about said second end of said sleeve, said lock clip having a generally central opening shaped to matingly fit over said non-circular surface and to be longitudinally slidable relative to said sleeve, said lock clip including a lock tab extending from a portion of the periphery thereof generally parallel to said bore; and
   - tab retention means defined by said support member for preventing said lock clip from rotating and thereby preventing said sleeve from rotating.

2. An improvement as in claim 1, including:
   - a lock nut upon said threaded shank adjacent said second end of said connector for engagement with said second end of said sleeve to selectively limit rotation of said connector relative to said sleeve.

3. An improvement as in claim 2, including:
   - a plurality of flat lateral faces on said connector adjacent said second end thereof.

4. An improvement as in claim 1, including:
   - a spacer fitting about said second end of said sleeve adjacent said non-circular surface thereon, said spacer abutting said lock clip, a distance defined by the combined thicknesses of said spacer and said lock clip being less than the longitudinal extension of said non-circular surface.

5. An improvement as in claim 4, including:
   - a lock nut on said threaded shank adjacent said second end of said connector for engagement with said second end of said sleeve to selectively limit rotation of said connector relative to said sleeve.

6. An improvement as in claim 5, including:
   - a plurality of flat lateral faces on said connector adjacent said second end thereof.

7. An improvement as in claim 5, wherein said non-circular surface comprises a plurality of flat lateral surfaces.

8. An improvement as in claim 1, wherein said relatively stationary support member is contiguous with an upright unit of a lift truck, said tension member comprises lift chain means trained over motor means of said upright unit and connected at its opposite ends to a carriage of said upright unit and to an upright member thereof.

9. An improvement as in claim 8, including:
   - a lock nut upon said threaded shank adjacent said second end of said connector for engagement with said second end of said sleeve to selectively limit rotation of said connector relative to said sleeve.

10. An improvement as in claim 9, including:
    - a plurality of flat lateral faces on said connector adjacent said second end thereof.

11. An improvement as in claim 8, including:
    - a spacer fitting about said second end of said sleeve adjacent said non-circular surface thereof, said spacer abutting said lock clip, a distance defined by the combined thicknesses of said spacer and said lock clip being less than the longitudinal extension of said non-circular surface.

12. An improvement as in claim 11, including:
    - a lock nut upon said threaded shank adjacent said second end of said connector for engagement with said second end of said sleeve to selectively limit rotation of said connector relative to said sleeve.

13. An improvement as in claim 12, including:
    - a plurality of flat lateral faces on said connector adjacent said second end thereof.

14. An improvement as in claim 1, wherein said seat portion of said support member comprises a generally spherical taper formed in said end of said bore and said seat engaging portion comprises an annular shoulder adjacent the first end of said sleeve arranged for bearing engagement with said generally spherical taper.

15. An improvement as in claim 14, including:

a lock nut upon said threaded shank adjacent said second end of said connector for engagement with said second end of said sleeve to selectively limit rotation of said connector relative to said sleeve.

16. An improvement as in claim 15, including:

a plurality of flat lateral faces on said connector adjacent said second end thereof.

17. An improvement as in claim 16, including:

a spacer fitting about said second end of said sleeve adjacent said non-circular surface thereon, said spacer abutting said lock clip, a distance defined by the combined thickness of said spacer and said lock clip being less than the longitudinal extension of said non-circular surface.

18. In a lift truck mast assembly including a carriage, at least one movable upright mast unit, at least one fixed upright unit, motor means with lift chain means trained over said motor means for connection at its opposite ends to said carriage and said fixed upright unit respectively, and an adjustable anchor arranged at at least one end of said lift chain means which comprises a relatively stationary support member having a bore therethrough; a seat portion of said member formed adjacent an end of said bore; an adjustable sleeve within said bore, a first end of said sleeve having a seat engaging portion arranged for bearing engagement with said seat portion of said support member, a second end of said sleeve extending outwardly from said bore, said sleeve defining a longitudinally extending threaded internal bore; and a connector having a threaded shank, a first end of said connector being in threaded engagement with the said internal bore of said sleeve and a second end of said connector being attached to said at least one of said lift chain means; an improvement comprising:

a non-circular surface formed on said second end of said sleeve;

a lock clip fitting about said second end of said sleeve, said lock clip having a generally central opening shaped to matingly fit over said non-circular surface and to be longitudinally slidable relative to said sleeve, said lock clip including a lock tab extending from a portion of the periphery thereof generally parallel to said bore; and tab retention means defined by said support member for preventing said lock clip from rotating and thereby preventing said sleeve from rotating.

19. An improvement as in claim 18, including:

a lock nut upon said threaded shank adjacent said second end of said connector for engagement with said second end of said sleeve to selectively limit rotation of said connector relative to said sleeve.

20. An improvement as in claim 19, including:

a spacer fitting about said second end of said sleeve adjacent said non-circular surface thereon, said spacer abutting said lock clip, a distance defined by the combined thickness of said spacer and said lock clip being less than the longitudinal extension of said non-circular surface.

21. An improvement as in claim 20, including:

a plurality of flat lateral faces on said connector adjacent said second end thereof.

22. An improvement as in claim 20, wherein said seat portion of said support member comprises a generally spherical taper formed in said end of said bore and said seat engaging portion comprises an annular shoulder adjacent the first end of said sleeve arranged for bearing engagement with said generally spherical taper.

23. An improvement as in claim 19, wherein said non-circular surface comprises a plurality of flat lateral surfaces.

* * * * *